No. 688,945. Patented Dec. 17, 1901.
L. W. DE GRAVE.
TOOL FASTENER FOR COAL CUTTING OR SIMILAR MACHINES.
(Application filed July 12, 1901.)
(No Model.)
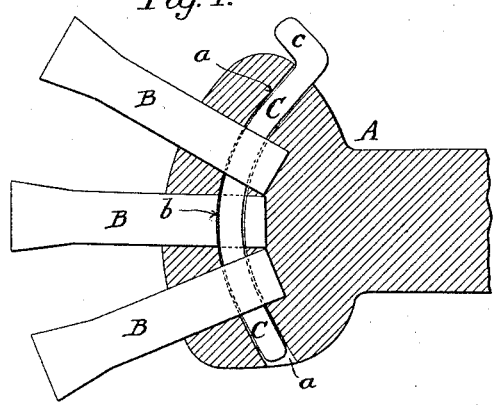
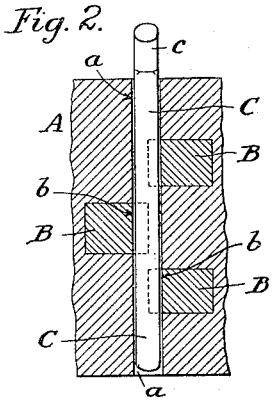
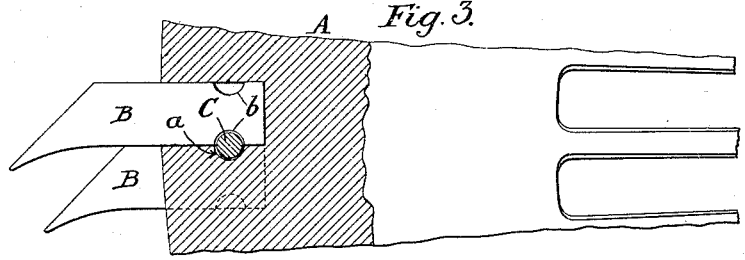
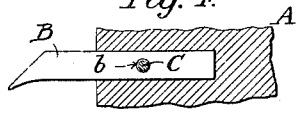
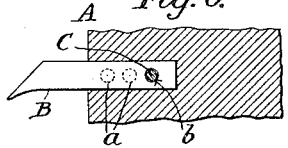
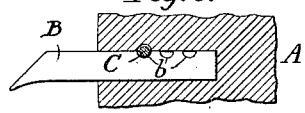
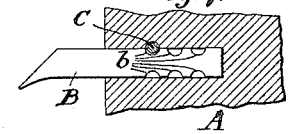
WITNESSES:
M. J. Dixon
G. Burroughs
INVENTOR:
Lancelot Walter de Grave.
By Henry H. Bates.
Attorney.

UNITED STATES PATENT OFFICE.

LANCELOT WALTER DE GRAVE, OF DERBY, ENGLAND, ASSIGNOR OF ONE-HALF TO HENRY DAVIS, OF DUFFIELD, ENGLAND.

TOOL-FASTENER FOR COAL-CUTTING OR SIMILAR MACHINES.

SPECIFICATION forming part of Letters Patent No. 688,945, dated December 17, 1901.

Application filed July 12, 1901. Serial No. 67,987. (No model.)

*To all whom it may concern:*

Be it known that I, LANCELOT WALTER DE GRAVE, a subject of the King of Great Britain, residing at 11 Charnwood street, Derby, in the county of Derby, England, have invented certain new and useful Improvements in Tool-Fasteners for Coal-Cutting or Similar Machines, (for which application for patent has been made in Great Britain, bearing No. 1,408, dated January 22, 1901,) of which the following is a specification.

This invention relates to an improved arrangement for securing the knives or tools in the wheel, chain, bar, or the like of coal-cutting and the like machines.

It consists, essentially, in forming one or more socket-holes in the tool-holder to receive the tools and making one or more recesses or notches on the edge or edges of or a hole or holes through the latter and providing a curved pin which is inserted in a corresponding hole in the holder, formed approximately at right angles to the tool-socket, so that such pin will engage one of the notches or recesses in or pass through one of the holes in the tool, and so hold same securely in the wheel, chain, bar, or the like of the machine.

In order that my invention may be fully understood, I will proceed to describe same by the aid of the accompanying sheet of drawings, in which—

Figure 1 is a longitudinal vertical section through the tool-holder; Fig. 2, a transverse vertical section, and Fig. 3 a horizontal section, of such holder. Figs. 4, 5, 6, and 7 are all horizontal sections through the holder, Fig. 4 showing the hole to receive the pin made through the tool instead of in the edge or edges, as shown in Figs. 1, 2, and 3. Fig. 5 shows the tool formed with several notches or recesses to receive the pin, so as to permit of the tool being adjusted as it wears away. Fig. 6 shows the holder made with a series of holes to receive the pin for the same purpose; and Fig. 7 shows the tool made with a series of notches or recesses in each edge, so as to enable same to be reversed to work in either direction.

Referring to Figs. 1, 2, and 3, A is the holder, in which sockets are formed to receive the shanks of the tools B. These shanks are provided with a notch or recess $b$ on one or, as shown, on both edges. In addition to the sockets to receive the tools the holder has a curved opening $a$ formed therein at approximately right angles to such sockets, and through this opening $a$ is passed the curved pin C, which engages the notch or recess $b$ on one edge of the tool, so as to lock the same securely in position in the holder. By withdrawing pin C the tools may be removed for reversing the same or for replacing them by others when requisite. The head $c$ of pin C is preferably cranked, as shown, so that any friction or pressure acting on it while working tends to turn the pin, and thus lock it in the hole in holder A, through which it passes.

In Fig. 4 the opening $b$ in the shank of the tool is in the form of a hole made through the same instead of a notch or recess formed in the edge.

In Fig. 5 the shank of the tool B has a series of notches or recesses $b$ formed on one edge to enable the tool to be adjusted in the socket of holder A as it wears away by causing the pin C to engage one or other of such notches or recesses.

In Fig. 6 the holder A is formed with a series of openings $a$ to receive the pin C, which also permits of the adjustment of the tool B.

In Fig. 7 the shank of the tool B has a series of notches or recesses $b$ on both edges, thus enabling the tool to be both adjusted and reversed when requisite. It will be readily understood that instead of notches or recesses in each edge a series of holes might be made through the shank of the tool and a single opening only to receive the pin C be made through the holder A, which would also permit of the tool being both adjusted and reversed when requisite.

What I claim as my invention, and desire to secure by Letters Patent, is—

The improved means for securing tools in the tool-carriers of coal-cutting or like machines, consisting of a holder provided with a plurality of radial sockets for receiving the tool-shanks, a curved aperture in said holder traversing said sockets approximately at right angles thereto respectively, and a curved pin adapted to enter said apertures and engage the shanks of the tools in said sockets to secure the same in position, said tool-shanks being suitably recessed for that purpose, substantially as specified.

In testimony whereof I have signed my name to this specification in the presence of two subscribing witnesses.

LANCELOT WALTER DE GRAVE.

Witnesses:
ARTHUR H. GARRAWAY,
WILLIAM HY. EVANS.